Patented Feb. 23, 1943

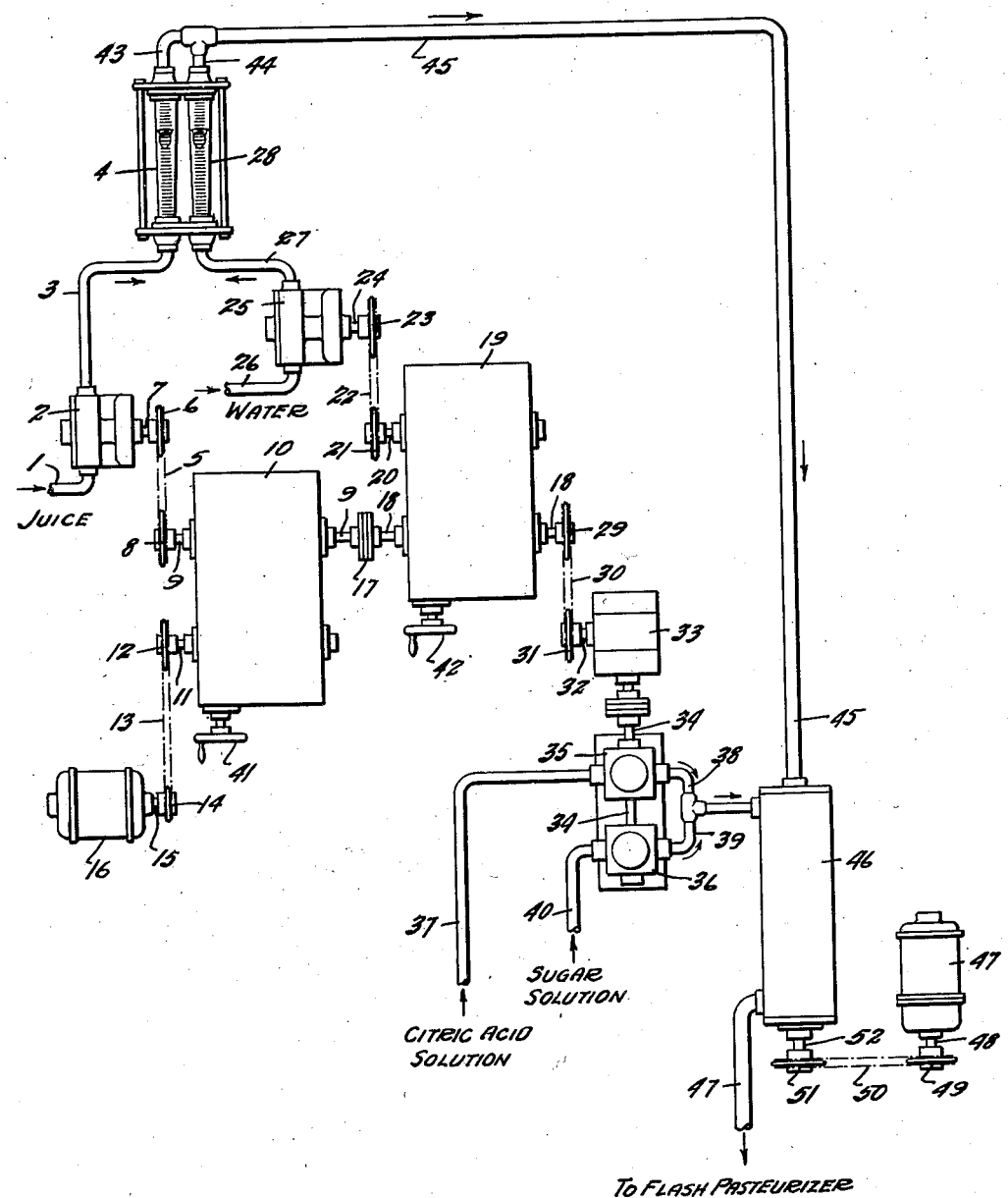

2,312,111

UNITED STATES PATENT OFFICE 2,312,111

CONTROL APPARATUS

Ronald B. McKinnis, Winter Haven, Fla., assignor to Sunshine Foods Inc., Winter Haven, Fla., a corporation of Florida Application March 23, 1940, Serial No. 325,644

4 Claims. (Cl. 259—2)

My invention relates to the mixing of fluids, and particularly to mixing fluids for drinks so as to obtain the proper proportions of the various ingredients.

An object of the invention is to provide a closed and continuous proportional mixing system for making drinks.

A further object of the invention is to provide a system for not only regulating the total quantity of output, but also regulating the proportions of each of the ingredients in the drink as desired.

Further objects are to provide means for measuring the speed of flow of the various liquids so as to enable desired adjustments to be made.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

In the drawing the single figure of the drawing illustrates diagrammatically a system embodying the invention.

Referring to the drawing, I have shown a system for making an orange drink wherein juice and water are mixed together with the desired quantities of sugar syrup and citric acid. The juice has its vitamin and flavor characteristics in unoxidized form. The juice supplied to the system may not be sterile. In practice the juice would not be sterile until it had been "commercially sterile" by pasteurizing. The juice is preferably extracted in a non-oxidizing atmosphere, for instance in the presence of an inert gas such as $CO_2$.

The numeral 1 indicates a juice line which receives juice, such as orange juice, from some suitable source, not shown. The line 1 leads to the juice pump 2 of a constant displacement type. From the juice pump 2 the juice is pumped through a line 3 to a flow meter 4.

The juice pump 2 is driven by a chain 5 which passes over a sprocket 6 mounted on a shaft 7 of the pump. The chain 5 passes over a sprocket 8 which is mounted on and rotates with a shaft 9 driven by a master speed control transmission. The details of the variable speed transmission for this master control are not shown, and may be any of a number of suitable types. The master variable speed transmission 10 is driven by a shaft 11 through a sprocket 12 over which passes a chain 13 that is driven from a sprocket 14 mounted on a shaft 15 of an electric motor 16. The shaft 9 projects beyond the housing for the variable speed transmission 10 and is coupled, as indicated at 17, to a shaft 18 of a second variable speed transmission 19. The shaft 18, through the mechanism in the variable speed transmission 19, not shown, drives a drive shaft 20 which has mounted thereon a sprocket 21. Carried on the sprocket 21 is a chain 22 which drives a sprocket 23 mounted on a shaft 24 of a water pump 25 of a constant displacement type, similar to the juice pump 2. Water is supplied through a line 26 to the pump 25.

Water is discharged from the pump 25 through a line 27 which leads to a flow meter 28. Mounted on the shaft 18 is a sprocket 29 which drives a chain 30, and imparts power to a sprocket 31 mounted on a shaft 32 of a speed reduction transmission 33.

Through the speed reduction transmission 33 a shaft 34 is caused to rotate and to drive a variable volume control proportioning pump 35. The pump 35 may be of a variable stroke type or other type which will produce a variable output. Also driven by the shaft 34 is a similar variable volume control sugar solution pump, indicated by the numeral 36.

Citric acid solution is fed through an input line 37 to the pump 35 which discharges the citric acid solution to a line 38 that joins with a discharge line 39 leading from the sugar solution proportioning pump 35.

To supply sugar solution to the pump 36 I have provided a line 40 leading to a source of sugar solution, not shown.

The speed of the shaft 9 driven by the master variable speed control transmission 10 is determined by means of a regulating mechanism, indicated generally by the numeral 41. The variable speed transmission 19 which controls the rate of feed of the water from the pump 25 is controlled by a control mechanism 42. By adjusting the control mechanism 42 the speed of rotation of the shaft 20 can be determined so that the proportion of water to juice, visually indicated by the flow meters 4 and 28, delivered to a mixer mechanism, can be easily regulated.

From the flow meter 4 for the juice and the flow meter 28 for the water there are lines 43 and 44, respectively, which feed together to a line 45 which leads to a mixer 46 which may be one of any number of types, and which is not shown in detail. The pipe lines 38 and 39, respectively, feed citric acid and sugar solutions into the mixer in direct proportion to the amount of juice fed. In the mixer 46 the water and juice mixture is thoroughly mingled with the sugar solution and the citric acid. The mixer 46 may be driven by a gear head motor 47, upon the shaft 48 of which is mounted a sprocket 49 which drives through a chain 50 a sprocket 51 mounted on a shaft 52 of the mixer 46.

In operation, by adjusting the regulating mechanism 41 the total output of the system can be controlled through the master variable speed transmission 10. In order to effect different mixtures between the amount of juice and the amount of water, the control 42 is employed to control the output from the water pump 25. The amount of juice and the amount of water which are delivered by the juice pump 2 and the water pump 25 can be easily determined from an inspection of the flow meters 4 and 28 in the juice and water lines, respectively. The amount of citric acid solution and sugar solution delivered to the system can be controlled by regulating the stroke of the variable stroke pumps 35 and 36, respectively. From the mixer 46 the completely mixed drink is discharged through a pipe 47 to a flash pasteurizer and from thence to storage or canning mechanism.

The system is particularly adapted for the manufacturing of an orange drink from juice which has been extracted under non-oxidizing conditions. At no time in the mixing operation is the juice exposed to the atmosphere and great care must be taken that on delivery of the drink from the flash pasteurizer to cans that oxidation of the delicate vitamin and taste constituents of the juice in the orange drink are not affected.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In an apparatus for mixing a drink comprising juice, water, sugar and citric acid, a source of power, a mixing chamber, a pump for feeding the juice to the mixing chamber, a master variable speed transmission for driving the juice pump and for regulating the flow of the ingredients to the mixing chamber, a second variable speed transmission operatively connected to and driven by said first mentioned transmission, a second pump for feeding water to the mixing chamber driven by said second mentioned transmission, sugar and citric acid pumps connected to and driven by the second mentioned transmission, and means to admit the juice, water, sugar and citric acid into the mixing chamber in the absence of air.

2. In an apparatus for mixing a drink comprising juice, water, sugar, and citric acid, a source of power, a mixing chamber, a pump for feeding the juice to the mixing chamber, a master variable speed transmission for driving the juice pump and for regulating the flow of the ingredients to the mixing chamber, a second variable speed transmission operatively connected to and driven by said first mentioned transmission, a second pump for feeding water to the mixing chamber driven by said second mentioned transmission, variable stroke pumps for feeding the citric acid and sugar driven by the second mentioned transmission, and means to admit the juice, water, sugar and citric acid into the mixing chamber in the absence of air.

3. In an apparatus for mixing a drink comprising juice, water, sugar and citric acid, a source of power, a mixing chamber, a pump for feeding the juice, a master variable speed transmission for driving the juice pump and for regulating the flow of the ingredients to the mixing chamber, a second variable speed transmission operatively connected to and driven by the first mentioned transmission, a second pump for feeding the water driven by said second mentioned transmission, a common means to admit the juice and water into the mixing chamber, citric acid and sugar pumps connected to and driven by said second mentioned transmission, and additional means to admit the sugar and citric acid into the mixing chamber wherein the ingredients are thoroughly admixed.

4. In an apparatus for mixing a drink comprising juice, water, sugar and citric acid, a source of power, a mixing chamber, a pump for feeding the juice, a master variable speed transmission for driving the juice pump and for regulating the flow of the ingredients to the mixing chamber, a second variable speed transmission operatively connected to and driven by the first mentioned transmission, a second pump for feeding the water driven by said second mentioned transmission, a common means to admit the juice and water into the mixing chamber, variable stroke pumps for the citric acid and sugar connected to and driven by said second mentioned transmission, and additional means to introduce the sugar and citric acid into the mixing chamber wherein the ingredients are thoroughly admixed.

RONALD B. McKINNIS.